United States Patent [19]

Ghormley et al.

[11] 4,068,095
[45] Jan. 10, 1978

[54] PORTABLE TERMINAL WITH SELF-CONTAINED COLLAPSIBLE STAND

[75] Inventors: Kristine D. Ghormley, Menlo Park; Mark H. Georgia, Oakland, both of Calif.

[73] Assignee: Spencer Cleveland, San Francisco, Calif.

[21] Appl. No.: 784,195

[22] Filed: Apr. 4, 1977

[51] Int. Cl.² .......................................... H04M 11/00
[52] U.S. Cl. ............................... 179/2 DP; 179/2 C; 179/147; 179/179
[58] Field of Search .................... 179/1 C, 2 C, 2 DP, 179/147, 178, 179

[56] References Cited
FOREIGN PATENT DOCUMENTS 130,303  12/1950  Sweden ............................... 179/147

*Primary Examiner*—George G. Stellar
*Attorney, Agent, or Firm*—Townsend and Townsend

[57] ABSTRACT

A compact portable terminal for use with a telephone handset and providing a highly stable acoustically isolated mechanical support for the telephone handset when in an opened position. An upper housing member having a keyboard, a visible display and function switches on the upper portion thereof and a bottom portion incorporating an acoustical coupler device for removably receiving a telephone handset is pivotally connected at one end to a lower housing member having a top portion incorporating a spring-loaded telephone handset cradle means for supporting the telephone handset received by the coupler device when the cradle mechanism is in an operative position. The cradle mechanism includes a spring-biased cradle plate pivotally mounted in a central cavity in the lower housing member which is automatically extended to the operative position when the device is opened. The free end of the cradle plate is contoured conformably with the side and back surfaces of the telephone handset handle to provide a stable mechanical support therefor.

A latching mechanism comprising a latching dog slidably mounted in the opposite end of the upper housing member, a spring-biasing means for normally urging the latching dog to the latching position and a button for enabling momentary movement of the latching dog to an unlatching position; and a corresponding latching slot formed in the lower housing member maintains the device in a closed position when the device is not in use.

12 Claims, 8 Drawing Figures

PORTABLE TERMINAL WITH SELF-CONTAINED COLLAPSIBLE STAND

BACKGROUND OF THE INVENTION

This invention relates to portable acoustical terminals of the type employed in conjunction with a telephone handset.

Portable terminals are known which are designed for use with telephone handsets for the purpose of sending and receiving information in the form of digital pulses along the transmission lines of the telephone system. Such devices, of which the disclosure in U.S. Pat. No. 3,976,840 issued Aug. 24, 1976 is representative, incorporates a manually operable keyboard for enabling manual selection of information to be transmitted to a site remote from the portable terminal, a pair of acoustic couplers for enabling the device to be acoustically coupled to the transmitter and receiver portions of a convention telephone handset with efficient acoustical isolation from the ambient noise, and electrical circuitry for converting keyboard generated electrical signals into acoustical signals within the telephone system bandwidth for transmission to a remote site and for converting acoustical signals generated by the telephone receiver in response to receipt of electrical signals from the remote site into electrical signals for operating a visible display. While the device disclosed in the abovereferenced U.S. Pat. No. 3,976,840 is specifically designed for use in transmitting and receiving securities quotation and transaction execution requests, many other potential uses exist for a portable terminal incorporating the elements noted above. Examples of such potential uses are a portable credit card verification terminal for enabling small retailers to participate in a computer based credit card veritification system, a field support terminal for sales personnel for enabling orders to be placed directly, and for inventory to be queried, via telephone to a centralized computer, a portable telegram terminal for enabling users to send a telegram via computer without the necessity of intervention by a human operator, a retail order entry terminal for customer use with mail order catalogs, and similar applications.

Common to all such uses of portable terminals of the above type, regardless of the field of application, is the requirement that the device be mechanically stable when physically coupled to the telephone handset so as to render the keyboard and display readily useable by the operator. Efforts to date to design a truly portable terminal with the required mechanical stability when coupled to the telephone handset have not met with wide success.

SUMMARY OF THE INVENTION

The invention comprises a portable terminal which is physically and acoustically engagable with a telephone handset and which affords mechanical stability and acoustical isolation from the environment when the telephone handset is physically attached thereto.

In the preferred embodiment, a first housing member has a top portion incorporating a manually operable keyboard and a visible character generator, e.g. an LED alpha-numeric display, and a bottom portion incorporating an acoustical coupler device for removably receiving a telephone handset. A second housing member is pivotally interconnected to the first housing member at one end thereof by means of a hinge, and the second housing member has a top portion incorporating a spring-loaded telephone handset cradle mechanism for supporting a telephone handset received by the coupler device when the cradle mechanism is in an operative position. The cradle mechanism includes a cradle plate having a first end pivotally coupled to the inner side walls of an upwardly opening central cavity in the lower housing member and a spring for biasing the cradle plate to the operative position automatically when the device is opened. The cradle plate has a free end provided with a contour which closely follows the contour of a substantial portion of the side and back wall outer surface of the handle portion of conventional telephone handsets.

The first housing member has a substantially planar bottom peripheral surface and the bottom portion thereof includes a central region which extends below the plane of this bottom peripheral surface; and the central cavity of the second housing member is dimensioned to receive this central region when the device is in a closed position. A pad of resilient material is secured to the floor of the central cavity adjacent the hinged end of the second housing member to provide an acoustically isolated support for that portion of the telephone handset resting on the second housing member. The second housing member further includes a bottom portion having a plurality of support members providing acoustical isolation of the device from a support surface on which the unit is placed in use.

A manually operable latching mechanism is provided for latching the upper and lower housing members in the closed position, the latching mechanism including a downwardly extending member slidably received in the upper housing member, a manually operable externally accessible portion coupled to the downwardly extending member and means for biasing the downwardly extending member from an unlatching position to a latching position, the downwardly extending member having a free end portion terminating in a latching tip; and a latch slot formed in the top portion of the lower housing member for receiving the latching tip of the downwardly extending member when the device is in the closed position.

For a fuller understanding of the nature and advantages of the invention, reference should be had to the ensuing detailed description taken in conjunction with the accompanying drawings.

DESCRIPTION OF THE PREFERRED EMBODIMENT

Figure 1:
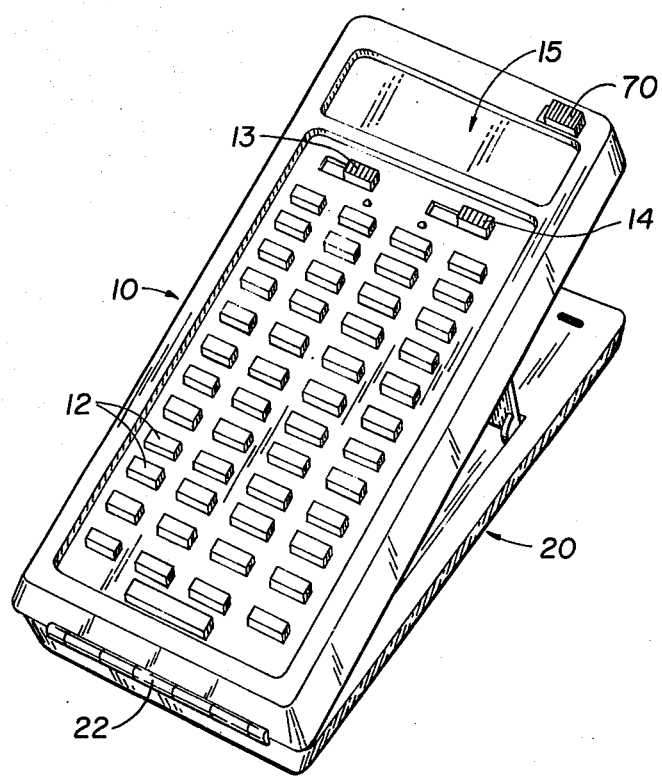
FIG. 1 is a perspective view of the preferred embodiment of the invention showing the portable terminal in an operative position.

Turning now to the drawings, FIG. 1 shows a preferred embodiment of the invention in the operative position for supporting a telephone handset when in use. As seen in this figure, an upper housing member generally designated by reference numeral 10 has a top portion provided with a manually operable keyboard having a plurality of keys 12, an on-off switch 13, a mode switch 14, and a visible character generator 15, the latter comprising a light-emitting diode (LED) display, a liquid crystal display (LCD), or the like. The precise function of each key 12 is not critical to an understanding of the invention; however, it is understood that the array of keys 12 is arranged in such a manner that numeric, alphanumeric, and function data entries may be made by the operator in some orderly fashion, e.g. that described in the above-referenced U.S. Letters Patent. Similarly, the function of mode switch 14 is dependent upon the particular use of application for which a given terminal is intended.

Top housing member 10 is pivotally connected at one end thereof to a bottom housing member generally designated by reference numeral 20 by means of a hinge 22 coupled therebetween in any suitable fashion. Hinge 22 may be a separate member, for example, secured to the adjacent ends of top housing member 10 and bottom housing member 20; alternatively, hinge 22 may comprise complementary portions integrally molded to housing members 10 and 20 and configured to be snap-fitted together.

Figure 2:
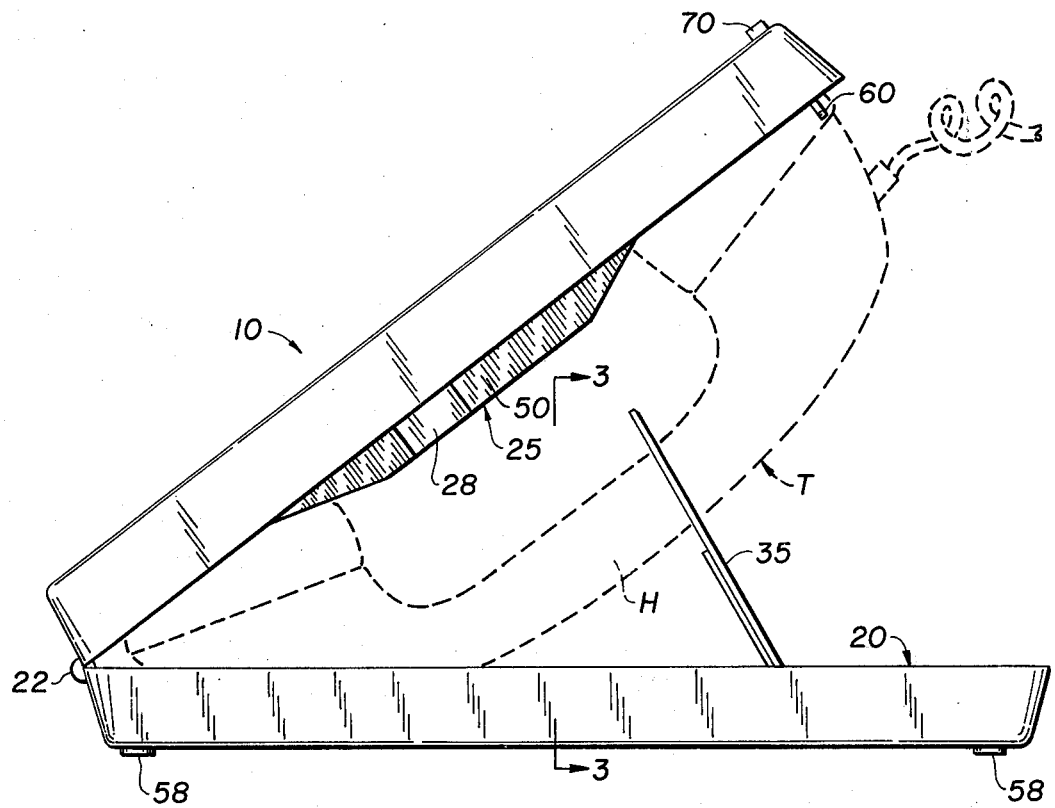
FIG. 2 is a side view of the invention shown in FIG. 1.
Figure 5:
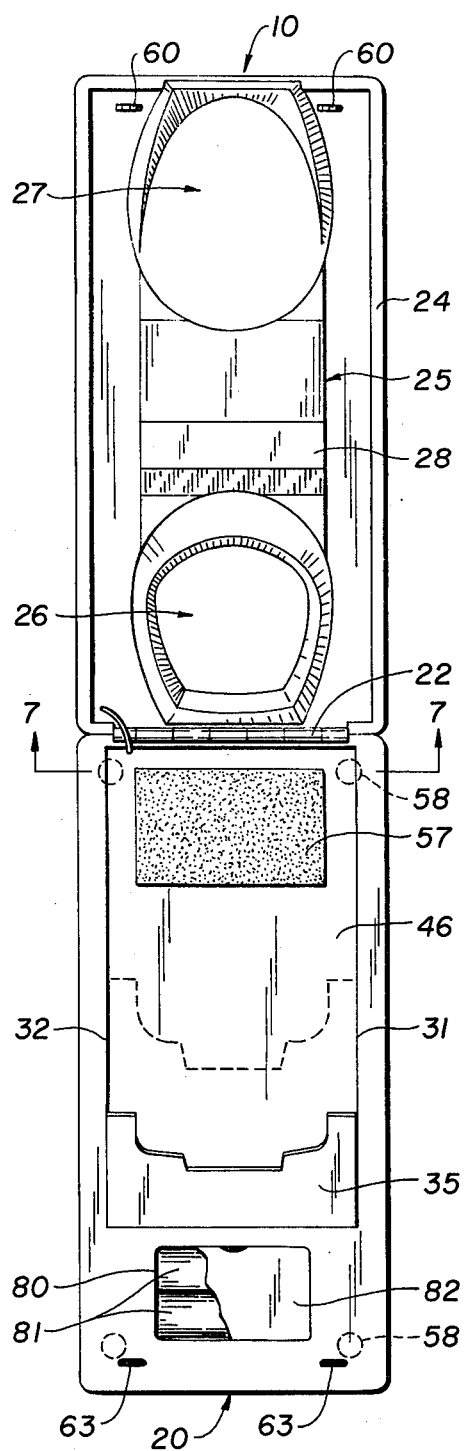
FIG. 5 is a plan view of the invention in a fully opened attitude.

With reference to FIGS. 2 and 5, top housing member 10 has a substantially planar peripherally extending surface 24 and a bottom portion having a downwardly depending central region 25 and longitudinally spaced acoustic coupler regions 26, 27. Central region 25 may include a recess and socket (not shown) for removably receiving a security token encased in a housing 28 without which the terminal will be rendered inoperable. Acoustic coupler regions 26 and 27 house conventional acoustic transducing elements and mufflers, such as the acoustic coupler disclosed in U.S. Pat. No. 3,585,302, the disclosure of which is hereby incorporated by reference. Upper housing member 10 is also designed to contain therewithin the necessary electronic circuitry for enabling operation of the device as a portable terminal capable of communicating with a remote computer when a conventional telephone handset is physically and acoustically coupled to the acoustic transducing elements and mufflers housed in regions 26 and 27.

Figure 4:
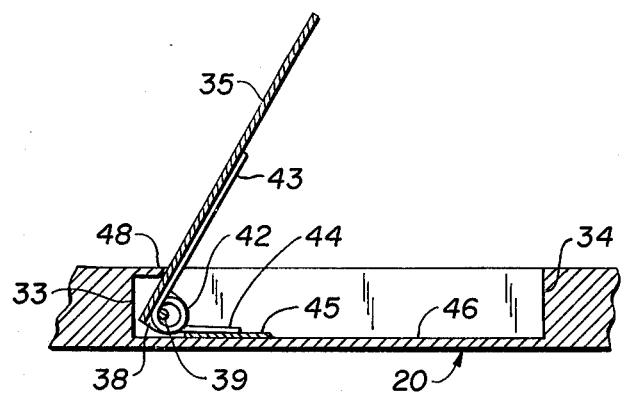
FIG. 4 is a sectional view taken along lines 4—4 of FIG. 3.
Figure 3:
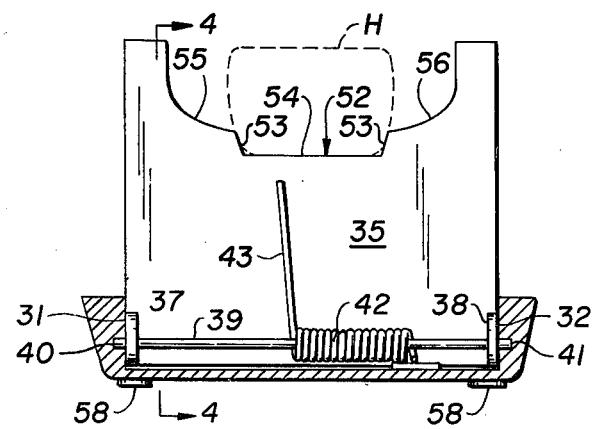
FIG. 3 is a sectional view taken along line 3—3 of FIG. 2.

With reference to FIGS. 2-4, lower housing member 20 is provided with an upwardly opening longitudinally extending central recess having sidewalls 31, 32 and endwalls 33, 34 and in which a cradle plate 35 is pivotally mounted. Cradle plate 35 is provided with a pair of reinforcing tabs 37, 38 at the lower corners thereof, with each reinforcing tab 37, 38 having a through aperture for receiving the free end of a wire rod 39. Each end of rod 39 is passed through the aperture in the corresponding tab portion 37, 38 and received in a blind recess 40, 41 formed in sidewalls 31, 32. A coiled spring 42 is received about rod 39 with a first end 43 thereof in contact with the surface of cradle plate 35 and the remaining end 44 thereof in contact with a pad 45 carried by the floor 46 of the central cavity in bottom housing member 20. Spring 42 normally biases cradle plate 35 to the operative position illustrated in FIGS. 2-4 in which the upper surface of cradle plate 35 abuts an extension 48 formed in the upper surface of bottom housing member 20 and affording a limit stop. The longitudinal extent of limit stop 48 is preferably chosen such that the sum of the angle subtended by cradle plate 35 and floor 46 and the angle subtended by surface 50 and floor 46 is less than 90° when surface 50 contacts the free end of cradle plate 35, in order to ensure that cradle plate 35 is automatically retracted to a nesting position within the central cavity of bottom housing member 20 when the terminal is manipulated to the closed position illustrated in FIG. 6. Further, the vertical component of the spring force provided by spring 42 should be greater than the vertical component of the force due to the combined weight of upper housing member 10 and the telephone receiver so that the terminal is mechanically stable in the open position illustrated in FIGS. 1 and 2.

As best seen in FIG. 3, the free end of cradle plate 35 is provided with a compound contour generally designated with reference numeral 52 which preferably closely follows the contour of a sufficient portion of the side and back outer wall surfaces of the handle portion of conventional telephone handsets to ensure that the handset is cradled in a mechanically stable fashion when the device is in use. More particularly, contour 52 includes portions 53 and 54 which are contoured and dimensioned to receive a sufficient portion of the side and back outer wall surfaces of the handle portion of a standard telephone handset (outlined in phantom), and also portions 55 and 56 for accommodating the handle portion of a PRINCESS telephone (not shown).

Figure 7:
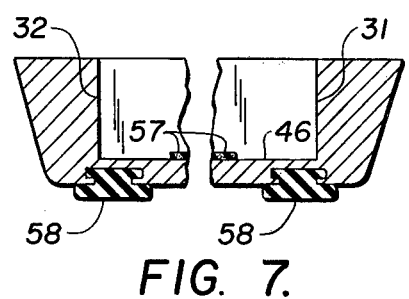
FIG. 7 is a partial sectional view taken along lines 7—7 of FIG. 5.

As best shown in FIGS. 5 and 7, a resilient pad 57 is secured to floor 46 by any suitable means, e.g. adhesive, adjacent the hinged end of bottom housing member 20 in a location at which the telephone handset makes physical contact with the floor 46 when in use (FIG. 2). Also, a plurality of resilient support members 58, fabricated from rubber, foam or the like are secured to bottom housing member 20 for supporting the unit on a surface. Pad 57 and resilient members 58 provide acoustical isolation of the unit from environmental vibrations to reduce the possibility of erroneous data transmission between the telephone and a remote computer.

Figure 8:
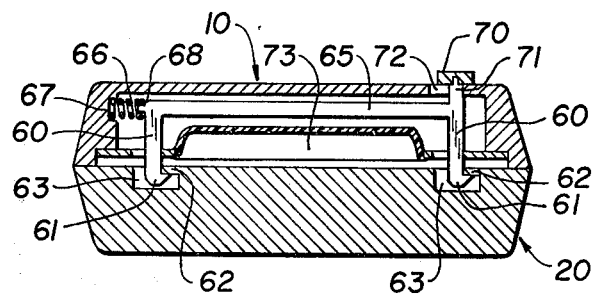
FIG. 8 is a sectional view taken along lines 8—8 of FIG. 6 illustrating the latch mechanism.
Figure 6:
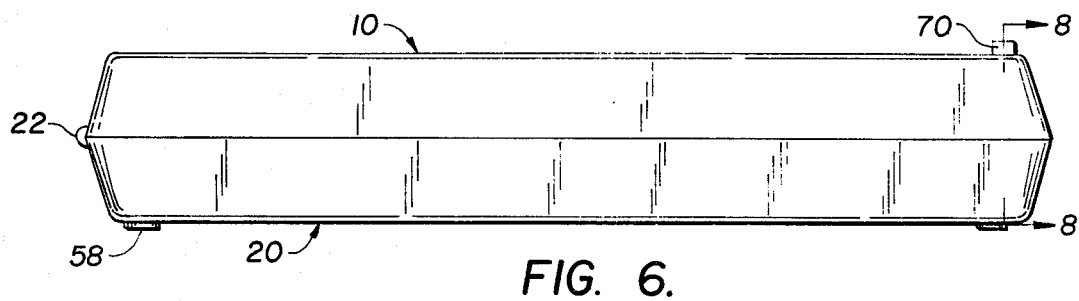
FIG. 6 is a side view similar to FIG. 2 showing the invention in the closed position.

The invention is further provided with a manually operable latching mechanism to maintain the terminal in the closed position illustrated in FIG. 6, the latching mechanism preferably being located at the opposite end of the device from hinge 22. As best shown in FIG. 8, the latching mechanism includes a pair of downwardly projecting latching dogs 60 each having a latching tip 61 engageable with the underside of a latching edge 62 forming part of a recess 63 in the top portion of bottom housing member 20. Latching dogs 60 are interconnected by a bar 65, and spring means 66 received at a first end in recess 67 formed in upper housing member 10 and received about a small projection 68 extending from bar 65 at a second end normally urges latching dogs 60 to the latching position illustrated in FIG. 8. A manually engageable button 70 is attached to bar 65 by means of an integral connecting member 71 received in a slot 72 formed in the upper wall portion of upper housing member 10. The latching mechanism comprising elements 60, 61, 65, 66, 70 and 71 is slidably arranged within a central cavity 73 formed in upper housing member 10 so that manipulation of button 70 to the left as viewed in FIG. 8 causes the latching dogs 60 to slide to the left to disengage latching tips 61 from latching surfaces 62, while release of button 70 causes spring 66 to bias the latching dogs 60 to the right as viewed in FIG. 7 to the latching position illustrated. Bottom housing member 20 also includes a battery compartment 80 adjacent the latching end thereof for housing batteries 81, and a removable cover 82.

In use, with the device in the closed position illustrated in FIG. 6, button 70 is moved to the left by the user and upper housing member 10 is maneuvered to the open position illustrated in FIG. 2. Cradle plate 35 is rotated to the operative position by spring 42 and the device is ready to receive the telephone handset. Upper housing member 10 is next manipulated to a position in which the angle subtended with lower housing member 20 is greater than that illustrated in FIG. 2 (and which may extend, if desired, up to 180° as shown in FIG. 5), after which the telephone handset is physically engaged with acoustic coupler regions 26, 27. Upper housing member 10 is then maneuvered back to the position shown in FIG. 2 in which cradle plate 35 supports the telephone receiver shown in broken lines in FIG. 2. In this position, the combination of the terminal and telephone handset forms a highly stable configuration enabling the user to freely manipulate keys 12 and switches 13 and 14. After the transaction initiated by the user via telephone is completed, the telephone handset may be removed in a reverse manner to that described above, and upper housing member 10 is manipulated to the closed position illustrated in FIG. 6. During closing, surface 50 abuts the free end of cradle plate 35, forceably retracting this element to the nesting position.

As will now be apparent, portable terminals constructed according to the invention afford a high degree of mechanical stability and acoustical isolation when a telephone handset is coupled thereto, while at the same time being extremely compact in size. Additionally, the invention not only provides mechanical support for the telephone handset when in the open position, but also provides a protective enclosure for the acoustic coupler regions 26, 27 and the security token contained in housing 28 when in the closed position. Further, the invention is rugged in construction and can be fabricated at very low cost using conventional plastic molding techniques.

While the above provides a full and complete disclosure of the preferred embodiments of the invention, various modifications, alternate construction and equivalents may be employed without departing from the true spirit and scope of the invention. Therefore the above description and illustrations should not be construed as limiting the scope of the invention which is defined by the appended claims.

What is claimed is:

1. A portable terminal for use with a telephone handset, said terminal comprising:
    first housing means having a top portion incorporating a manually operable keyboard and a visible character generator, and a bottom portion incorporating an acoustical coupler means for removably receiving a telephone handset;
    second housing means having a top portion incorporating a spring-loaded telephone handset cradle means for supporting a telephone handset received by said coupler means when said cradle means is in a operative position; and
    means for pivotally intercoupling said first and second housing means to enable said portable terminal to be manipulated between a closed position in which said cradle means is retracted and an open position in which said cradle means is extended to said operative position.

2. The combination of claim 1 wherein said second housing means has a pair of inner sidewalls partially defining an upwardly opening central cavity, and wherein said cradle means comprises plate means having a first end pivotally coupled to said inner sidewalls and means for biasing said plate means to said operative position.

3. The combination of claim 2 wherein said biasing means comprises a coiled spring having a first end coupled to said plate means and a second end coupled to said second housing means.

4. The combination of claim 2 wherein said plate means has a free end with a contour conformable with the handle portion of said telephone handset for receiving same.

5. The combination of claim 2 wherein said central cavity has a floor portion and wherein said plate means subtends an acute angle with said floor portion when in said operative position.

6. The combination of claim 2 wherein said floor portion has a substantially flat surface and said plate means is substantially parallel to said flat surface when in said retracted position.

7. The combination of claim 2 wherein said central cavity has floor portion, and further including a resilient pad adhered to said floor portion adjacent said intercoupling means and adapted to contact a portion of said telephone handset to provide acoustical isolation therefor.

8. The combination of claim 2 wherein said first housing means has a substantially planar bottom peripheral surface, and said bottom portion includes a central region extending below the plane of said bottom peripheral surface, and wherein said central cavity of said second housing means is dimensioned to receive said central region when said terminal is in said closed position.

9. The combination of claim 1 wherein said second housing means includes a bottom portion, and resilient means secured to said bottom portion for providing acoustically isolated support for said terminal.

10. The combination of claim 1 wherein said pivotally intercoupling means comprises hinge means coupled to first adjacent ends of said first and second housing means.

11. The combination of claim 10 further including manually operable latch means coupled to second adjacent ends of said first and second housing means for releasably maintaining said terminal in said closed position.

12. The combination of claim 11 wherein said latch means comprises a downwardly extending member slidably received in said first housing means at the end remote from said first adjacent end thereof, a manually operable externally accessible portion coupled to said downwardly extending member and means for biasing said downwardly said extending member from an unlatching position to a latching position, said downwardly extending member having a free end portion terminating in a latch tip, and a latch slot formed in said top portion of said second housing means for receiving said free end portion of said downwardly extending member when said terminal is in said closed position.

* * * * *